Feb. 20, 1951  H. F. CROMWELL  2,542,906
VEHICLE WINDOW AND DOOR CONSTRUCTION
Filed Aug. 30, 1946  2 Sheets-Sheet 1
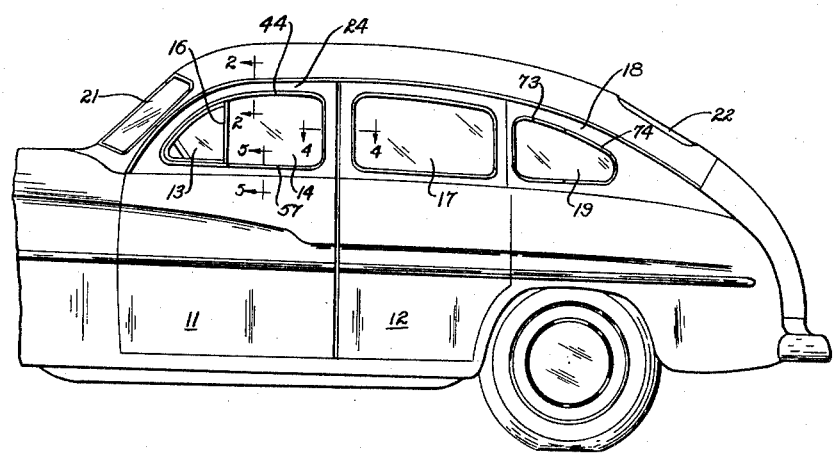
Fig. 1
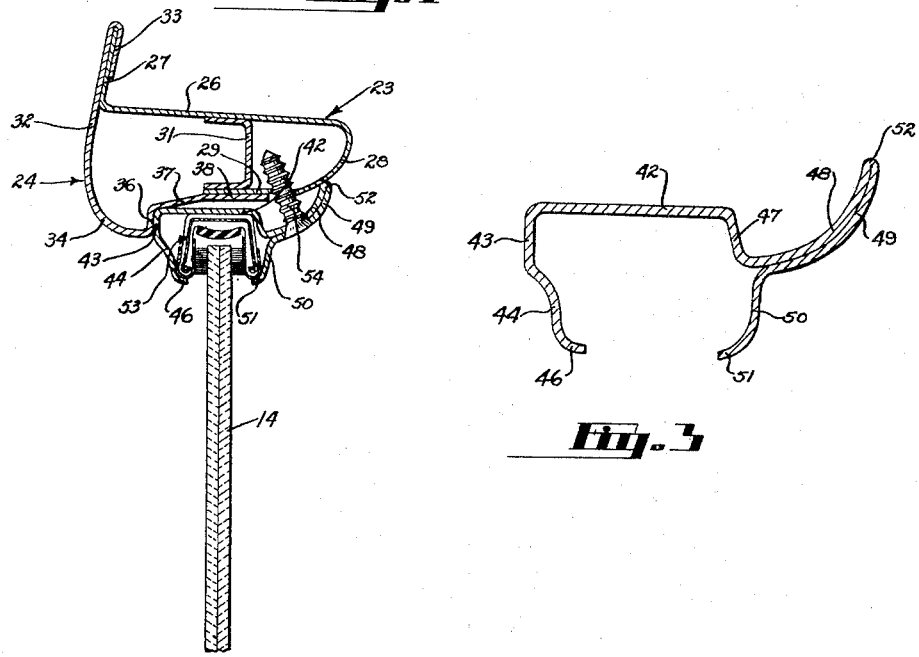
Fig. 2
Fig. 3
H. F. CROMWELL.
*INVENTOR.*
BY
C. C. McRae
R. D. Harris
J. R. Faulkner
T. H. Oster
ATTORNEYS.

Feb. 20, 1951  H. F. CROMWELL  2,542,906
VEHICLE WINDOW AND DOOR CONSTRUCTION
Filed Aug. 30, 1946  2 Sheets-Sheet 2

H. F. CROMWELL.
INVENTOR.

ATTORNEYS.

Patented Feb. 20, 1951

2,542,906

UNITED STATES PATENT OFFICE 2,542,906

VEHICLE WINDOW AND DOOR CONSTRUCTION

Herbert F. Cromwell, Detroit, Mich., assignor to Ford Motor Company, Dearborn, Mich., a corporation of Delaware Application August 30, 1946, Serial No. 693,847

2 Claims. (Cl. 296—44)

This invention relates generally to body construction for automotive vehicles and has particular reference to door and window constructions for such vehicles.

In modern automotive body construction, doors are generally constructed of inner and outer panels suitably joined together to form a unitary door construction and provided with window openings in their upper portions. The outer half of the glass run or guide for the window is usually mounted upon the outer door panel, whereas the inner half of the glass run is mounted upon a separate window frame or garnish molding which is attached to the door at the inboard side of the window glass after the window and its associated regulator mechanism has been assembled within the door. This garnish molding serves not only to form a support for part of the glass run but also covers the edges of the inner door panel and the adjacent trim material to form a decorative molding. A separate molding, usually chrome plated, is generally mounted upon the outer door panel to improve the appearance of the door.

With the present invention the above-mentioned garnish molding, outer chrome plated molding, and separate glass run assemblies are replaced by a single assembly which may be pre-assembled and installed as a unit in the door during final assembly. This unit comprises a single continuous window frame within which a glass run assembly is mounted. In addition to supporting the glass run assembly, the frame provides an exposed decorative portion on each side of the door, thus performing the functions of both the interior garnish molding and the exterior molding customarily used.

A further advantage of the invention is that the window frame construction enables the construction of the door frame to be simplified. In addition, assembly expense is reduced since the entire window frame and glass run assembly can be bench assembled, and the need for separately assembling part of the glass run and an exterior molding to the door frame is eliminated.

Another object of the invention is to provide a window frame and door construction in which the window frame has a two-point contact with the door frame and can be placed under a slight stress during assembly to effectively eliminate leaks between the door and window frames and to minimize the possibility of squeaks developing.

Other objects and advantages will be more apparent as this description proceeds, particularly when considered in connection with the accompanying drawings, in which:

Figure 1 is a fragmentary side elevational view of an automobile incorporating the present invention.

Figure 2 is an enlarged vertical cross sectional view taken substantially on the plane indicated by the line 2—2 of Figure 1.

Figure 3 is a cross sectional view taken through the window frame alone and shown on a still larger scale.

Figure 4:
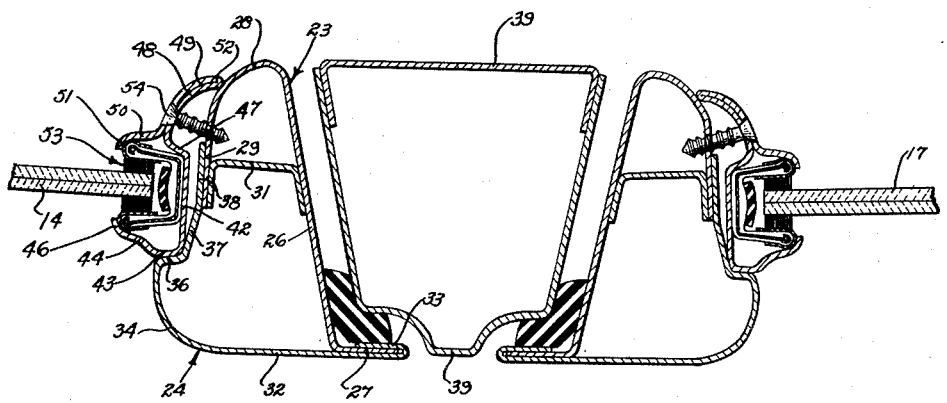
Figure 5:
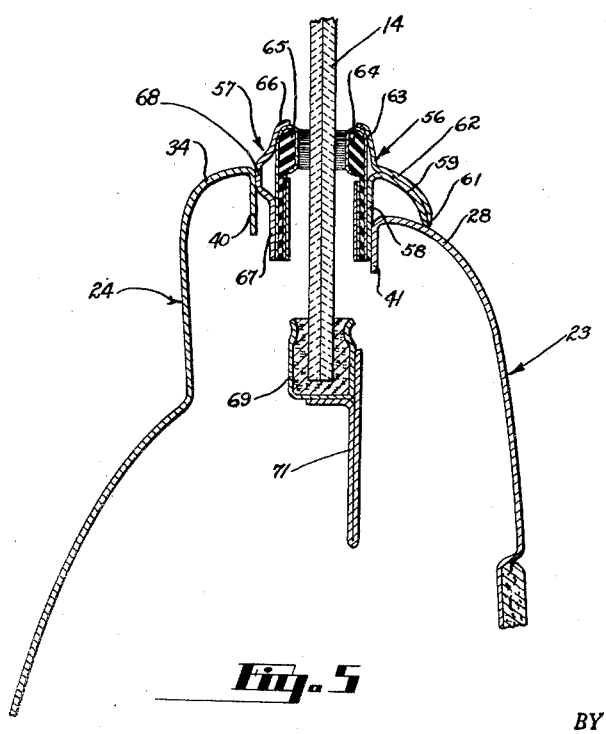

Figures 4 and 5 are cross sectional views taken substantially on the planes indicated by the lines 4—4 and 5—5 of Figure 1.

Referring now more particularly to the drawings, there is shown in Figure 1 an automobile having front and rear doors 11 and 12. Mounted within the upper portion of the front door 11 is a pivoted ventilating window 13 and a vertically slideable window 14, the two being separated by a vertical dividing bar. The rear door 12 contains a single vertically slideable window 17, and the rear quarter panel 18 of the body supports a fixed window 19. A windshield 21 and a rear window 22 are also provided.

Although the present invention is suitable for use in connection with any or all of the above-mentioned windows, for the purposes of illustration it will be described in connection with the front door 11 and the windows contained therein. With reference to Figure 2, which illustrates in cross section the upper portion of the front door 11, it will be seen that the latter is formed of an inner panel 23 and an outer panel 24. The upper section 26 of the inner panel extends generally at right angles to the plane of the door and at its outboard edge terminates with an upwardly extending flange 27. Section 26 forms a jamb face for the door and at its inboard edge continues into a curved return bend portion 28 and ends with a flat lower section 29 extending generally parallel to the upper section 26. The upper and lower sections 26 and 29 of the inner panel are reinforced by the U-shaped rib 31 which is suitably spot welded thereto.

The outer door panel 24 has a generally vertically extending portion 32 forming the exterior of the door and formed at its upper end with a flange 33 bent around the flange 27 of the inner door panel and spot welded thereto. The lower portion of the outer door panel is curved inwardly at 34 to form the window opening and is then bent upwardly to form a short vertical wall 36. The panel is then bent inwardly to provide an inclined portion 37 and finally a flat portion 38 positioned adjacent the lower flange 29 of the inner door panel and suitably welded thereto.

It will be apparent from Figure 4 that the construction of the rear vertical edge of the door frame adjacent the door pillar 39 is generally the same as the construction of the upper portion thereof previously described. Likewise, the front portion of the door frame adjacent the pillar between the windshield and the door, is of similar construction. From the foregoing it will be seen that a relatively simple door construction is provided requiring a minimum of fabrication.

The lower portion of the door, as best seen in Figure 5, is of necessity somewhat different, since it must be formed with a longitudinally extending slot therethrough for the passage of the vertically slideable window 14. The outer door panel 24 is accordingly formed with a downwardly extending flange 40 at the inboard edge of the inwardly curved portion 34 which forms the lower edge of the window opening. In similar fashion the inner door panel 23 has a flange 41 extending downwardly from the outboard edge of the curved portion 28 of the panel. The flanges 40 and 41 are spaced from each other to provide a slot therebetween through which the window glass extends.

The major portion of the window frame for the front door 11 has the cross sectional configuration best shown in Figure 3. The frame is formed of sheet metal and has a base portion 42 extending generally at right angles to the plane of the window glass. At its outboard edge the base portion 42 is bent at right angles to form an exterior sidewall 43 and is then bent inwardly toward the window glass to form the side flange 44 which terminates in a rolled edge 46. At its inboard edge the base portion 42 is sharply bent to form a short wall 47 which continues into an arcuate flange 48 extending generally in an inboard direction. The frame is then formed with a return bend arcuate portion 49 lying closely adjacent the arcuate portion 48, and finally with an inboard side flange 50 terminating in a lower rolled edge 51. A rolled edge 52 is formed between the arcuate portions 48 and 49.

Attention is now invited to Figures 2 and 4 which illustrate the assembly of the glass run within the window frame and the assembly of the window frame in the door. A glass run 53 of conventional construction is mounted within the channel formed by the window frame and is seated against the base portion 42 of the latter. The rolled edges 46 and 51, of the outboard and inboard side flanges 44 and 50 respectively, engage the lateral edges of the glass run and firmly support the latter within the window frame. Inasmuch as the glass run is somewhat flexible, the latter can be compressed for insertion within the window frame, or if desired, the rolled edges 46 and 51 may be crimped over the glass run after the latter has been inserted within the frame.

The vertical wall 36 and the inclined portion 37 of the outer door panel 24 form a shoulder against which the edge of the window frame is seated. In this position the exterior sidewall 43 of the window frame contacts the vertical wall 36 of the outer door panel, and a suitable sealer may be inserted therebetween to effectively seal the construction against the entrance of air and water. It will be noted that the base portion 42 of the window frame is spaced from the inclined portion 37 and the flat portion 38 of the door panel, to facilitate the assembly of the frame within the door, as will be seen more clearly as the description proceeds. The rolled inboard edge 52, formed at the junction between the arcuate portions 48 and 49 of the window frame, seats against the curved return bend portion 28 of the inner door panel 23. Two-point contact is thus provided between the door frame and the window frame. To secure the window frame in place, a plurality of screws 54 are provided and extend through the countersunk holes formed in the arcuate flanges 48 and 49 of the window frame and are threaded into the section 29 of the inner door panel. Inasmuch as the window frame is formed of relatively thin sheet metal, and engages the door frame at two widely spaced points, the screws 54 when tightened serve to slightly distort the window frame and place the latter under stress. This is advantageous since it helps prevent the screws 54 from loosening and provides a rigid construction minimizing the possibility of squeaks developing due to subsequent loosening of the parts.

In the case of the front door 11, the window frame construction is identical with that described above along the rearward and upper edges of the slideable window 14 and around the forward and lower edges of the pivoted window 13. The remaining section of the window frame, adjacent the lower edge of the slideable window 14, is of somewhat different construction and is best shown in Figure 5. This portion of the window frame is formed in two sections, namely an inboard section 56 and an outboard section 57. These sections are separately formed and are then butt welded to the ends of the section shown in Figure 3 to form a continuous window frame. The welded joints can be polished and the entire assembly plated so that the joints will be invisible.

The inboard section 56, shown in Figure 5, comprises a vertical flange 58 which lies adjacent the downwardly extending flange 41 of the inner door panel 23. An arcuate portion 59 extends in an inboard and downward direction from the upper edge of the vertical flange 58 and at its lower edge 61 rests against the curved portion 28 of the inner door panel. The section is then bent upwardly to provide an arcuate portion 62 immediately adjacent the arcuate portion 59. The inboard section 56 also has an upper flange 63 crimped over the upper edge of an inboard glass run strip 64, the latter being suitably cemented to the flanges 58 and 63 of the window frame section. A complementary outboard glass run strip 65 is provided and is cemented to the upper and lower flanges 66 and 67 of the outboard window frame section 57. Intermediate the upper and lower flanges 66 and 67 the window frame section 57 is provided with a rib 68 resting against the vertically extending flange 49 of the outer door panel 24. The glass run strips 64 and 66 provide a guide for the window glass 14, the lower edge of which is mounted within a channel 69 carried by the window regulator mechanism, partially shown at 71.

Although in the present instance no interior fabric trim material is shown, in some instances such material may be provided upon the curved portion 28 of the inner door panel in which case the inboard edges 52 and 61 of the window frame sections would serve to firmly clamp the fabric to the door panel, effectively preventing slippage or displacement of the fabric.

The assembly of the unitary window frame and glass run thus formed is extremely simple. The lower portion of the window frame, including the lower frame sections 56 and 57, is first inserted into the opening provided between the flanges 40 and 41 of the outer and inner door panels respectively, as best seen in Figure 5. The window frame is then swung in an outboard direction until the side wall 43 of the window frame engages the vertical wall 36 of the outer door panel. Clearance provided between the base portion 42 of the window frame and the portions 37 and 38 of the outer door panel provides sufficient space for the swinging movement of the window frame into its assembled position. The only remaining step in the assembly of the window frame in the door is the insertion of the screws 54 which firmly hold the window frame in position, as previously described.

The window frame may be either chrome plated, enameled, or otherwise formed to present an attractive appearance both from the interior and exterior of the vehicle, and thus, insofar as styling is concerned, replaces both the garnish molding usually mounted upon the interior of the door and the chrome plated molding mounted upon the exterior of the door. Furthermore the window frame supports the entire glass run unit, eliminating the necessity of mounting separate glass run units upon the door frame and the window frame, as has heretofore been the practice.

The construction described above can also be used in connection with the window 17 of the rear door 12 and if desired may also be used with the stationary rear quarter window 19 and even with the windshield 21 and rear window 22. In the case of a stationary window such as the rear quarter window 19, the window frame is made in two sections, a forward section 73 and a rearward section 74, to permit the frame to be telescoped during assembly so that it can be inserted into the window opening. The adjacent ends of the sections 73 and 74 can, if desired, be covered by a suitable molding clip. With a fixed window, of course, the entire window frame has the cross section shown in Figure 3.

It will be understood that the invention is not to be limited to the exact construction shown and described, but that various changes and modifications may be made without departing from the spirit and scope of the invention, as defined in the appended claims.

What is claimed is:

1. In an automobile body having a window opening therein and a window glass within said opening, a window frame insertable into said window opening and having exposed portions on both the interior and exterior of said vehicle body, said window frame being of generally U-shaped cross section and supporting a glass run assembly therein, a curved flange extending in an inboard direction from said U-shaped section and terminating in a rolled edge, said window frame and said automobile body being of such cross sectional configuration that contact is made between said frame and said body only in two transversely spaced zones, said zones each being relatively narrow in transverse extent so as to make substantially line contacts with said body, said two zones of contact being respectively adjacent the outboard edge of the base of said U-shaped section of the window frame and adjacent the rolled edge of said curved flange, and fastening elements between said zones of contact for clamping said window frame to said body, said frame being somewhat distorted when thus clamped.

2. In an automobile body having a window opening therein and a window glass within said opening, a window frame insertable into said window opening, said window frame comprising a flat base portion, a section extending substantially at right angles from the outboard edge of said base portion and continuing into a curved portion terminating in a crimped edge, a section extending generally at right angles from the inboard edge of said base portion and continuing into an arcuate flange extending in a direction outwardly of said window frame and toward the inboard side of said body, a return bend arcuate flange adjacent and at the inward side of said previously mentioned arcuate flange, and an inwardly extending inboard side flange terminating in a lower rolled edge.

HERBERT F. CROMWELL.

REFERENCES CITED

The following references are of record in the file of this patent:

UNITED STATES PATENTS

| Number | Name | Date |
| --- | --- | --- |
| 1,670,467 | Marshall | May 22, 1928 |
| 1,847,958 | Hamm | Mar. 1, 1932 |
| 1,949,269 | D'Ardeene | Feb. 27, 1934 |
| 1,991,643 | Wintercorn | Feb. 19, 1935 |
| 2,145,659 | Lane | Jan. 31, 1939 |
| 2,236,451 | Roethel | Mar. 25, 1941 |
| 2,236,827 | Mollet | Apr. 1, 1941 |
| 2,260,997 | Ledwinka | Oct. 28, 1941 |
| 2,262,644 | Mackey | Nov. 11, 1941 |

FOREIGN PATENTS

| Number | Country | Date |
| --- | --- | --- |
| 433,975 | Great Britain | Aug. 23, 1935 |